United States Patent
Hedman et al.

(10) Patent No.: US 7,992,698 B1
(45) Date of Patent: Aug. 9, 2011

(54) SYSTEM FOR PREVENTING GEAR HOPOUT IN A TOOTH CLUTCH IN A VEHICLE TRANSMISSION

(75) Inventors: Anders Hedman, Marstrand (SE); Hans Erhard, Kungälv (SE); Bengt Karlsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 705 days.

(21) Appl. No.: 12/093,333

(22) PCT Filed: Nov. 11, 2005

(86) PCT No.: PCT/SE2005/001708
§ 371 (c)(1),
(2), (4) Date: Jul. 3, 2008

(87) PCT Pub. No.: WO2007/055624
PCT Pub. Date: May 18, 2007

(51) Int. Cl.
*F16D 11/00* (2006.01)
*F16D 23/00* (2006.01)
*F16H 61/18* (2006.01)

(52) U.S. Cl. ..... 192/218; 192/69.9; 192/108; 192/114 T (58) Field of Classification Search ........... 192/69.9, 192/114 T
See application file for complete search history.

(56) References Cited

U.S. PATENT DOCUMENTS

| | | | |
|---|---|---|---|
| 3,537,558 A | 11/1970 | Ebbers | |
| 4,157,135 A * | 6/1979 | Devlin et al. | 192/69.9 |
| 4,454,938 A * | 6/1984 | Clements | 192/114 T |
| 4,615,422 A * | 10/1986 | Thebert | 192/69.9 |
| 5,626,213 A | 5/1997 | Janiszewski | |
| 6,066,062 A | 5/2000 | Pigozzi | |
| 6,244,413 B1 | 6/2001 | Gutmann et al. | |

FOREIGN PATENT DOCUMENTS

| | | |
|---|---|---|
| DE | 700712 C | 12/1940 |
| DE | 10335477 A1 | 2/2005 |
| EP | 0276382 A1 | 8/1988 |
| EP | 0511613 A1 | 11/1992 |
| JP | 4362314 A | 12/1992 |
| SU | 1183751 A1 | 10/1985 |

OTHER PUBLICATIONS

Supplementary European Search Report for corresponding European App. EP 05 80 2499.
International Search Report from corresponding International Application PCT/SE2005/001708.

* cited by examiner

*Primary Examiner* — Rodney Bonck
(74) *Attorney, Agent, or Firm* — WRB-IP LLP

(57) ABSTRACT

A system is provided for preventing gear hopout in a tooth clutch in a vehicle transmission, the tooth clutch including an engaging sleeve having sleeve clutch teeth. The tangent function for at least one of driving back-taper angle and braking back-taper angle is larger than the average value of clutch coefficient of friction and spline coefficient of friction multiplied by the sum of unity and the ratio of clutch teeth pitch diameter and spline teeth pitch diameter.

18 Claims, 4 Drawing Sheets

SYSTEM FOR PREVENTING GEAR HOPOUT IN A TOOTH CLUTCH IN A VEHICLE TRANSMISSION

BACKGROUND AND SUMMARY

The present invention relates to vehicle transmissions, and more particularly to a system for preventing gear hopout in tooth clutches that are subjected to misalignment due to forces acting on rotating parts they connect.

BACKGROUND OF THE INVENTION

Tooth clutches are frequently used in stepped vehicle transmissions to engage and disengage the gears. A tooth clutch can rotatably connect a main part with a substantially coaxial connectable part. Normally, an engaging sleeve is used as an interconnecting member between these two parts. This engaging sleeve is often rotatably fixed but axially moveable with respect to said main part by means of, for instance, splines. On the engaging sleeve there are clutch teeth at the end that faces the connectable part. These clutch teeth need to be compatible with corresponding clutch teeth on the connectable part. These two sets of clutch teeth can be brought into mesh with each other by moving the engaging sleeve in axial direction towards the connectable part.

In double-acting tooth clutches, there are clutch teeth at both ends of the engaging sleeve. Thereby, the engaging sleeve can connect the main part to either a first or a second connectable part. These connectable parts must have clutch teeth that are compatible with the clutch teeth at the corresponding end of the engaging sleeve.

Some tooth clutches comprising a main part, an engaging sleeve and connectable parts can be seen in U.S. Pat. No. 2,070,140, U.S. Pat. No. 3,137,376, DE-4319135A1 and U.S. Pat. No. 6,422,105.

In heavy road vehicles, such as heavy trucks, transmissions of range compound type are often used. In such a transmission, a main section, having several selectable gears, is connected in series with a range section. There are two gears in the range section; one low-range gear with a large speed reduction and one high-range gear with no speed reduction, normally referred to as a direct gear. In practice, the range section doubles the number of gears in the main section. A typical state-of-the-art heavy truck transmission of range compound type is shown in FIG. 1 in WO-2004069621, featuring a main section 2 and a range section 3.

Range sections are often embodied as a planetary arrangement that is combined with a double-acting tooth clutch. Due to the design of the planetary arrangement, the main part of the tooth clutch may be fixedly connected to the engaging sleeve and move axially with the sleeve. In such cases, the main part usually is the ring gear of the planetary arrangement. A typical example is shown in U.S. Pat. No. 4,667,538, where the engaging sleeve 18 is fixedly connected to the ring gear 14. In some embodiments, the engaging sleeve is integrated in the ring gear, for example as shown in EP-0916872 (FIG. 3, items 56 and 58) and, more advanced, in U.S. Pat. No. 5,083,993 (FIG. 1, item 24).

Figure 1A:
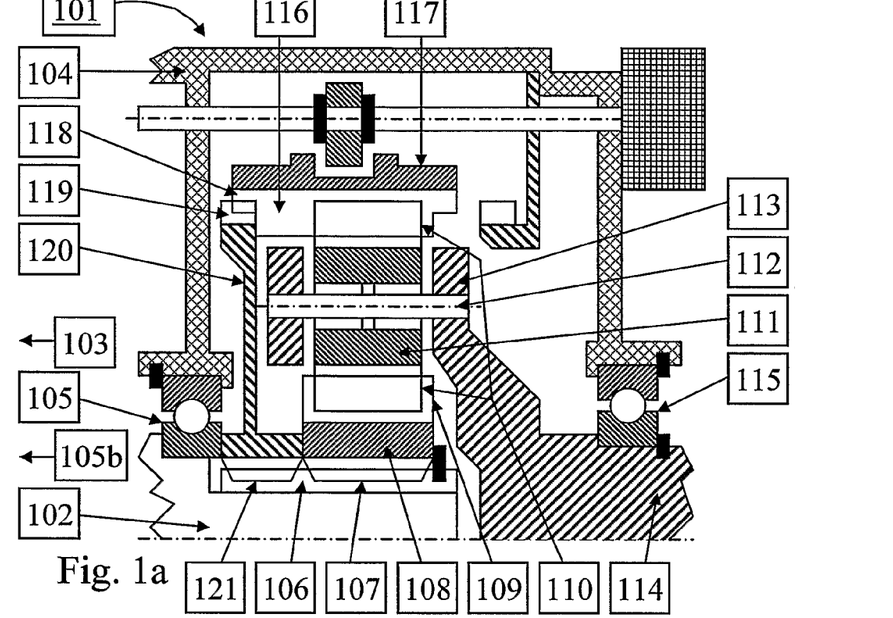
FIG. 1a shows a planetary range section of prior art in a direct high-range gear.
Figure 1B:
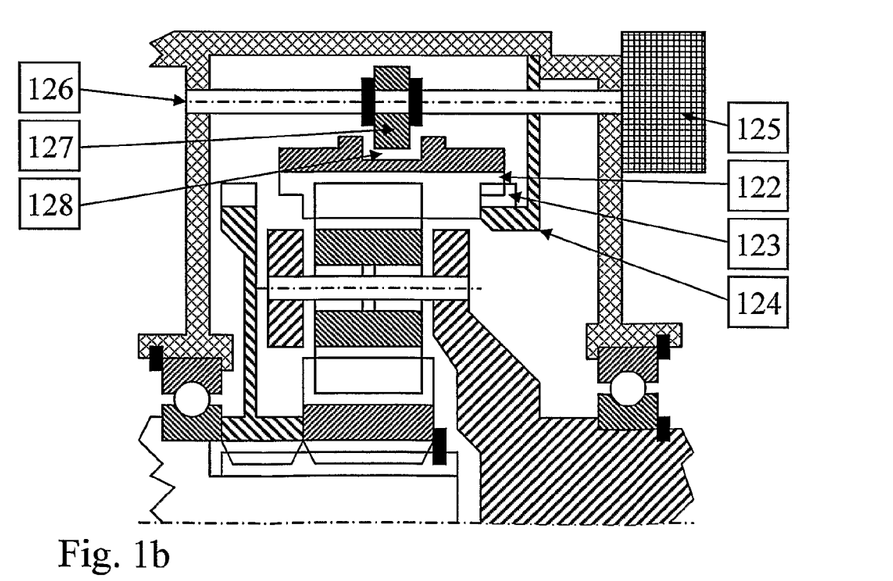
FIG. 1b shows the planetary range section of FIG. 1a in a low-range reduction gear.

FIG. 1a shows a longitudinal section of a simplified range section 101 of planetary type. The input shaft of the range section 101 is a main shaft 102 of a main section 103. A transmission housing 104 rotatably supports the main shaft 102 by means of a bearing 105 and a bearing 105b in the main section 103. There are external spline teeth 106 at the end of the main shaft 102. The spline teeth 106 are meshing with internal spline teeth 107 of a sun gearwheel 108. External gear teeth 109 of the sun gearwheel 108 are in mesh with external gear teeth 110 of a planet gearwheel 111. A planet axle 112 rotatably supports the planet gearwheel 111 to a planet carrier 113 that is shown integral with an output shaft 114. A number of identical planet gearwheels are located with substantially equal spacing along the periphery of the planet carrier 113. An output bearing 115 rotatably supports the output shaft 114 to the transmission housing 104. The external gear teeth 110 of the planet gearwheel 111 also mesh with internal gear teeth 116 of a ring gearwheel 117. In the position shown in FIG. 1a, internal direct clutch teeth 118 of the ring gearwheel 117 mesh with external clutch teeth 119 of a direct engaging ring 120. Internal spline teeth 121 of the direct engaging ring 120 are in mesh with the external spline teeth 106 of the main shaft 102. Hence, in FIG. 1a the ring gearwheel 117 is rotationally connected to the main shaft 102 by means of the direct engaging ring 120. Thereby, the planet gearwheel 111 cannot move in peripheral direction relative to the main shaft 102. The result is that the main shaft 102, the output shaft 114 and the parts in between will rotate in a unison way, that is, with the same speed. This represents the direct high-range gear. In FIG. 1b, the ring gearwheel 117 has been moved to the right in comparison with FIG. 1a. Thereby, the direct clutch teeth 118 are no longer in mesh with the external clutch teeth 119 of the direct engaging ring 120. Instead, internal reduction clutch teeth 122 of the ring gearwheel 117 have been brought into mesh with external clutch teeth 123 of a stationary engaging ring 124 that is fixedly connected to the transmission housing 104. Thereby, the ring gearwheel 117 will not rotate when in the position of FIG. 1b. The result will be the low-range reduction gear; the output shaft 114 will rotate slower than the main shaft 102.

A range shift actuator 125 accomplishes the axial displacement of the ring gearwheel 117. A range shift rod 126 is being pushed or pulled in appropriate direction by the range shift actuator 125. A range shift fork 127 is fixedly attached to the range shift rod 126. The range shift fork 127 extends into a circumferential groove 128 on the ring gearwheel 117. The range shift actuator 125 may be of one of several types, for instance hydraulic, pneumatic, electromagnetic or electromechanical. Normally, the range shift actuator 125 is only activated during a shift. When a shift has been completed, it will be deactivated.

In the range section of FIG. 1a and FIG. 1b the ring gearwheel can be regarded as a combined main part and engaging sleeve of a double-acting tooth clutch. Furthermore, it can be noted that only one bearing 115 supports the output shaft 114. The planetary range section 101 provides another support. When torque is being transferred by gearwheels and clutch teeth of the planetary range section 101, contact forces in the gear and tooth clutch meshes around the periphery will urge the parts to become substantially coaxial. When the planetary range section 101 is transferring no torque, it will still provide some support for the output shaft 114, albeit with a lower degree of coaxiality between the parts. Thus, the gearwheels along with the tooth clutches of the planetary range section 101 will act as some kind of a second supporting bearing for the output shaft 114. Then, in high range position, as shown in FIG. 1a, the main shaft 102 indirectly supports the output shaft 114.

Tooth clutches are normally designed to be self-retaining in engaged state. This means that once the tooth clutch has been engaged, no external force is required to retain the tooth clutch in this engaged state. Different design solutions are used to achieve this self-retaining feature. One common design solution is to have the clutch teeth angled in order to create a nominal axial force that urges the sleeve to retain in engaged position when torque is being transferred in the tooth clutch. This solution is often referred to as back-taper design. An example is shown in U.S. Pat. No. 5,626,213. There, in FIG. 2 it can be seen that the clutch teeth flanks 21, 26 are angled α, θ with respect to the flanks 28 of the spline teeth 11 of the engaging sleeve 8. Thereby, the contact forces will urge the clutch teeth towards fully engaged position when torque is being transferred. Some other design solutions for self-retaining action can be seen in U.S. Pat. No. 2,070,140 and FR-2660723.

In most self-retaining tooth clutch designs at least one of the sets of clutch teeth is made by modifying a set of spline or gear teeth. Returning to U.S. Pat. No. 5,626,213, the angled back-tapered flanks 26 of the engaging sleeve 8 can be regarded as a slight modification of the flanks 28 of the internal spline teeth 11. Similarly, in FIG. 1a and FIG. 1b back taper on the clutch teeth 118 and 122 can be made by modifying the internal gear teeth 116 of the ring gearwheel 117. A rolling operation is a rapid and very cost-effective method to embody such modifications. In a rolling operation the flanks of the spline or gear teeth of an engaging sleeve or gearwheel are deformed plastically by meshing with the teeth of a mating tool wheel under radial load and rotation. Unfortunately, the material volume that can be plastically deformed in a rolling operation is small. Hence, the back-taper angles (α, β in U.S. Pat. No. 5,626,213) that are feasible to achieve in a rolling operation are small, typically about 5 degrees. This is, however, sufficient for most applications of tooth clutches.

Figure 2:
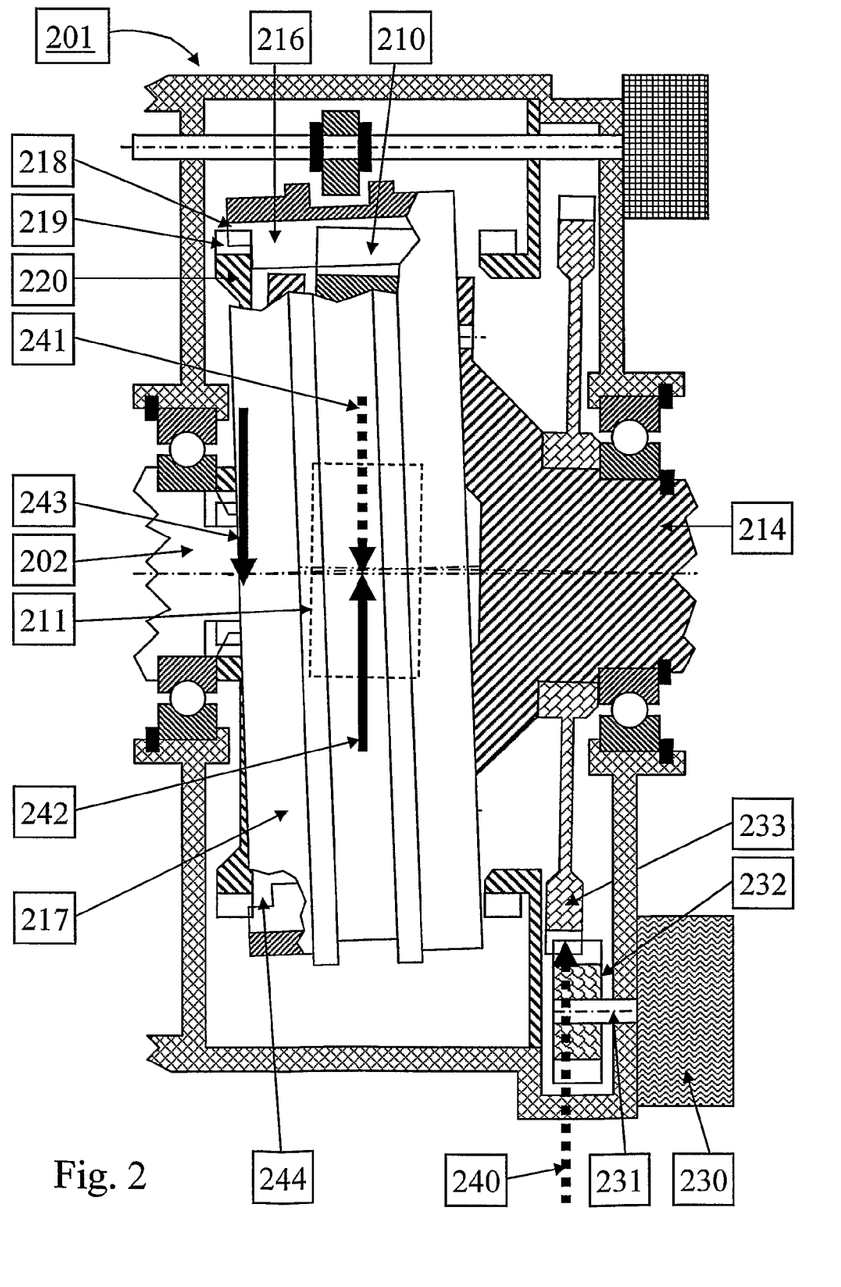
FIG. 2 shows a planetary range section of prior art with a retarder unit, including forces and misalignments that may occur and may lead to gear hopout.

There are some applications where conventionally made back-tapered clutch teeth have been shown to have insufficient self-retaining action. One example is shown in FIG. 2, where, in comparison with FIG. 1a, a retarder unit 230 has been added to the range section 201. The retarder unit 230 is an auxiliary brake that can be used in long down-hill slopes in order to reduce wear and prevent over-heating of the ordinary wheel brakes of the vehicle. The retarder unit is driven by a retarder shaft 231 that is rotatably connected to a retarder driven gearwheel 232. In turn, the retarder driven gearwheel 232 meshes with a retarder driver gearwheel 233 that is rotationally connected to the output shaft 214 of the range section 201.

When the retarder unit 230 is in operation, gear mesh forces 240 will act on the retarder driver gearwheel 233. These forces will tend to misalign the output shaft 214. Normally, engine braking is used simultaneously with retarder operation. Thereby, torque will be transferred by the range section, and there will be contact forces in the gear meshes and between the clutch teeth of the range section. These contact forces will urge the parts of the range section towards a substantially coaxial state, as was described earlier. Hence, the contact forces will counteract the tendency of the gear mesh forces on the retarder driver gearwheel 233 to misalign the output shaft 214.

Some retarder operating conditions have shown to cause problems in a planetary range section as in FIG. 2. One example is when there is a relatively large braking action in the retarder unit 230 and a relatively small engine braking action. This is illustrated schematically in FIG. 2. The retarder gear mesh force 240 tends to misalign the output shaft 214 in clockwise sense in the view of FIG. 2. However, the retarder gear mesh force 240 is balanced by a planet gear mesh force 241 that acts on the gear teeth 210 of a planet gear 211 in the gear mesh with the internal teeth 216 of the ring gearwheel 217. The counter force to the planet gear mesh force 241 is the ring gear mesh force 242 that acts on the ring gearwheel 217. In turn, the ring gear mesh force 242 is balanced by a ring clutch mesh force 243 in the mesh between the clutch teeth 218 of the ring gearwheel 217 and the clutch teeth 219 of the direct engaging ring 220.

The ring mesh force 242 and the ring clutch force 243 compose a force couple that tends to misalign the ring gearwheel 217 in counter-clockwise sense as is indicated in FIG. 2. Thereby, an axial gap 244 will result between the clutch teeth 218 of the ring gearwheel 217 and the clutch teeth 219 of the direct engaging ring 220. Hence, during rotation there will be an urge for relative motion in axial direction between the clutch teeth 218 of the ring gearwheel 217 and the clutch teeth 219 of the direct engaging ring 220. This urge for relative motion may turn into an unstable state if the friction between the contacting clutch teeth is large and the self-retaining action from for instance back taper is insufficient. Then, the clutch teeth 218 of the ring gearwheel 217 will be fed out of engagement with the mating clutch teeth 219 of the direct engaging ring 220. Thereby, no torque can be transferred by the range section 201, and, consequently, no engine braking is possible.

Figure 3:
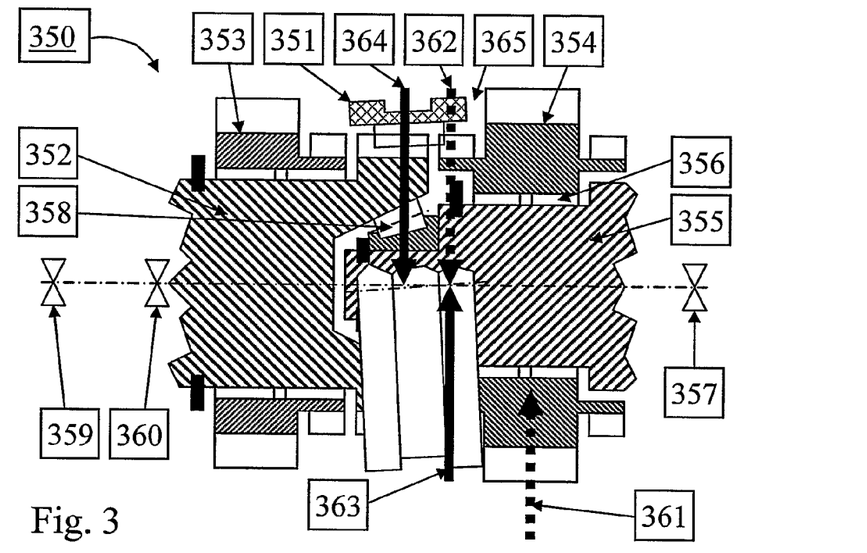
FIG. 3 shows a splitter unit in a gearbox of prior art, including forces and misalignments that may occur and may lead to gear hopout.

Another example is shown in FIG. 3; a splitter unit 350 of a gearbox. An engaging sleeve 351 can rotationally connect an input shaft 352 to either of a first gearwheel 353 and a second gearwheel 354. Each of gearwheels 353 and 354 is in mesh with a mating gearwheel that is rotationally fixed to a countershaft (not shown). The second gearwheel 354 is rotatably supported on a main shaft 355 by means of bearings 356. The main shaft 355 is supported in one end by a gearbox housing (not shown) by a symbolically shown bearing 357. The other end of the main shaft 355 is supported by the input shaft 352 by a taper roller bearing 358. The input shaft 352, in turn, is supported directly or indirectly by the gearbox housing by two symbolically shown bearings 359 and 360.

In FIG. 3, the engaging sleeve 351 is positioned to rotationally connect the input shaft 352 and the second gearwheel 354. Thereby, torque can be transferred from the input shaft 352 to the second gearwheel 354 and on to the mating gearwheel on the countershaft. Then, gear mesh forces 361 would act on the second gearwheel 354.

In operation, there might be an axial gap in the taper roller bearing 358. This axial gap could be the result of for instance thermal expansion and axial force components in gear meshes. In a taper roller bearing, an axial gap always corresponds to a radial gap. In the splitter unit 350 such a radial gap would decrease the radial support and allow a misalignment of the main shaft 355. Then, that misalignment would be counteracted by contact forces between the spline and clutch teeth of the input shaft 352, engaging sleeve 351 and second gearwheel 354. This is similar to what has been described above for planetary range sections. For the second gearwheel 354, the gear mesh force 361 would then be balanced by a gearwheel contact force 362 acting on the clutch teeth that are engaged with corresponding clutch teeth on the engaging sleeve 351. The counter force to the gearwheel contact force 362 is a sleeve clutch contact force 363 that acts on the clutch teeth of the engaging sleeve 351. For the engaging sleeve 351, the sleeve clutch contact force 363 is balanced by a sleeve spline contact force 364. Similar to FIG. 2, the sleeve clutch contact force 363 and the sleeve spline contact force 364 compose a force couple that urges to misalign the engaging sleeve 351. Then, an axial gap 365 can be created between the engaging sleeve 351 and the second gearwheel 354. During rotation, this might make the engaging ring 351 being fed out of engagement with the clutch teeth of the second gearwheel 354, very similar to the ring gearwheel 217 in FIG. 2.

Some conclusions can be drawn from the analysis of the systems in FIG. 2 and FIG. 3. In both cases there is a supported shaft (214, 355) that is supported radially by a supporting shaft (202, 352). A proper conventional radial support device between those shafts, such as a radial bearing (358), is either missing or insufficient under some conditions. Furthermore, the supported shaft is subjected to external forces (240, 361) that urge to misalign the supported shaft in relation to the supporting shaft. Those external forces can act directly on the supported shaft or via other parts, for instance a gearwheel (233, 354) that is fixed to or supported by the supported shaft. Finally, a tooth clutch with an engaging sleeve (217, 351) can selectably connect the supporting shaft for unison rotation with the supported shaft or a number of gearwheels (211, 354) that are radially supported by the supported shaft. Due to the combination of urge to misalign and an inadequate radial support device for the supported shaft, at least a part of the supporting action is accomplished by contact forces (241, 362) in the tooth clutch. These contact forces tend to misalign the engaging sleeve. Under certain conditions this misalignment might lead to gear hopout, that is, unwanted and uncontrolled disengagement of the tooth clutch.

Figure 4:
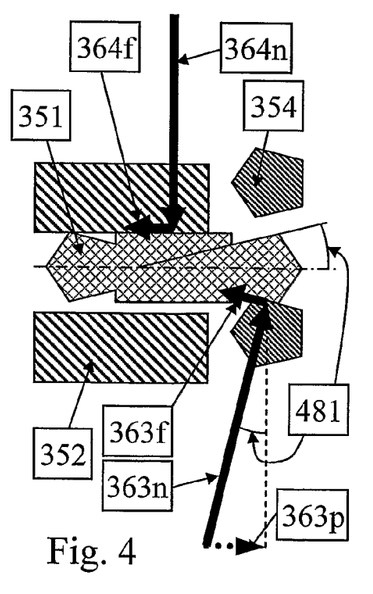
FIG. 4 shows a peripheral section of the teeth of the tooth clutch of the splitter unit of FIG. 3.

FIG. 4 shows a peripheral section of the splines and clutch teeth of the tooth clutch of FIG. 3. The internal clutch teeth of the engaging sleeve 351 are back-tapered with the back-taper angle 481 with respect to the axis of rotation. The mating flanks of the clutch teeth of the second gearwheel 354 have a corresponding back-tapered shape. The spline teeth on the input shaft 352 are straight, that is, parallel with the axis of rotation. Thereby, the sleeve spline contact force 364 will have a spline normal component 364n that is perpendicular to the axis of rotation and, hence, in a true tangential direction. The sleeve clutch contact force 363 has a clutch normal component 363n that is perpendicular to the back-tapered flank of the internal clutch teeth of the engaging sleeve 351. This clutch normal component 363n will be inclined with the back-taper angle 481 with respect to a true tangential direction. Due to this inclination, the clutch normal component 363n will have a component 363p that is parallel to the spline teeth of the engaging sleeve 351 and the input shaft 352 and, hence, perpendicular to the spline normal component 364n. This parallel component 363p urges the engaging sleeve 351 towards fully engaged position and resists relative motion towards gear hopout.

In U.S. Pat. No. 6,066,062 a planetary range section 3 with back-tapered clutch teeth 67, 68, 69, 70 is shown. The gearwheels in the planetary range section 3 have helical gear teeth. In helical gear teeth, the gear mesh forces have axial components. For the ring gearwheel 56, that axial force component must, in general, be balanced by an axial force component in the contacting clutch teeth 67, 68, 69, 70. In addition, a back-taper action is required in order to prevent gear hopouts. Therefore, these clutch teeth have at least one helical flank. In order to handle this, the following general definition of back-taper angle can be used:
  i) The balanced helix angle of a set of clutch teeth of an axially moveable part of a tooth clutch is the helix angle that would, under friction-free conditions, result in no net axial force from the contact forces acting on gear, spline and clutch teeth of the axially moveable part when torque is being transferred via the set of clutch teeth.
  ii) The back-taper angle of a set of contacting flanks of a set of clutch teeth of an axially moveable part of a tooth clutch is the difference between the actual helix angle for the set of contacting flanks and the balanced helix angle for the set of clutch teeth.

For the clutch teeth of the engaging sleeve 351 in FIG. 3 and FIG. 4, the spline teeth of the input shaft 352 are straight. Under hypothetic friction-free conditions, the sleeve spline contact force 364 would be perpendicular to the axis of rotation. Then, with a zero back-taper angle 481 the parallel component 363p would vanish, and the sleeve clutch contact force 363 would also be perpendicular to the axis of rotation. Hence, there would be no net axial force on the engaging sleeve 351 from the contact forces acting on its spline and clutch teeth. Thus, the balanced helix angle for the engaging sleeve 351 is zero.

For the planetary range section 3 in U.S. Pat. No. 6,066,062, the clutch teeth 67, 68, 69, 70 have a smaller diameter than the gear teeth of the ring gearwheel 56. Thereby, to fulfil torque equilibrium the contact forces on these clutch teeth will be larger than the corresponding mesh forces on the gear teeth. This implies that the balanced helix angle of the clutch teeth 67, 68 of the ring gearwheel 56 will be less than the helix angle of the gear teeth.

There are some known methods to prevent gear hopouts of the type described above. In general, radial support devices, such as bearings, have been introduced or improved in order to limit the possible misalignment of the supported shaft. In U.S. Pat. No. 5,839,319 a splitter unit similar to the one in FIG. 3 is shown. However, a headset/fourth gear 74 (corresponding to the second gearwheel 354 in FIG. 3) is not supported by a main shaft (corresponding to 355 in FIG. 3) but by a spindle 62 that is rigidly secured to an input shaft 42 (corresponding to 352 in FIG. 3). Thereby, a gear mesh force acting on the headset/fourth gear 74 will not cause any significant urge to misalign the main shaft. Hence, the tendency for gear hopout has been eliminated. However, the additional spindle will imply increased production cost.

U.S. Pat. No. 5,083,993 presents a planetary gear 1 that is similar to the planetary range section 101 in FIG. 1a. In order to reduce possible misalignment, a roller bearing has been included between a planet wheel carrier 9 (corresponding to the planet carrier 113 in FIG. 1a) that is integral with an output shaft 3 (corresponding to 114 in FIG. 1a) and a sun wheel 5 (corresponding to the sun gearwheel 108 in FIG. 1a) that is arranged in a rotationally fixed manner on an input shaft 2 (corresponding to the main shaft 102 in FIG. 1a). Thus, the roller bearing acts as a radial support device for a supported shaft, the output shaft 3, on a supporting shaft, the input shaft 2. However, the roller bearing will imply increased cost.

EP-239555B1 discloses a similar planetary gear 2. Therein, with the aid of a ball bearing 18 a clutch ring 16 supports a planet wheel keeper 10 that is fastened to a planet wheel carrier 11 which, in turn, is integrated with an output shaft 4. The clutch ring 16 is non-rotatably mounted on a sun wheel 7 that is non-rotatably mounted on an input shaft 3. In FIG. 1a the equivalence would be an additional ball bearing between the engaging ring 120 and the part of the planet carrier 113 that is to the left of the planet gearwheel 111. The additional ball bearing 18 will provide a radial support of the output shaft 4 and thereby reducing the possible misalignment. However, the ball bearing 18 will imply increased cost.

DETAILED DESCRIPTION

When studying FIG. 3 and FIG. 4 it can be noted that the misalignment of the engaging sleeve 351 will lead to a varying degree of engagement along the periphery with the clutch teeth of the second gearwheel 354. The lowest degree of engagement is where the axial gap 365 is largest. During rotation, this varying degree of engagement will require a relative motion between the clutch and spline teeth in contact of the engaging sleeve 351, input shaft 352 and second gearwheel 354. In order to prevent gear hopout, it is vital that this relative motion takes place. Thereby, friction will occur between the teeth in contact. In FIG. 4, the friction component of the sleeve clutch force 363 is referred to as 363$f$. Similarly, the friction component of the sleeve spline force 364 is referred to as 364$f$. In order to enable the relative motion between the contacting teeth, substantially the parallel component 363$p$ of the sleeve clutch force 363 must be larger than the sum of the friction forces 363$f$ and 364$f$:

$$363p > 363f + 364f$$

This assumes that the back-taper angle 481 is fairly small, for instance, less than 20 degrees. In FIG. 4, this inequality requirement does not seem to be fulfilled:

i) When sliding, the friction component 363$f$ of the sleeve clutch force 363 is equal to a coefficient of friction 363$mu$ multiplied by the normal component 363$n$:

$$363f = 363mu * 363n$$

ii) When sliding, the friction component 364$f$ of the sleeve spline force 364 is equal to a coefficient of friction 364$mu$ multiplied by the normal component 364$n$:

$$364f = 364mu * 364n$$

iii) Between clutch and spline teeth in contact in a vehicle gearbox, the coefficient of friction typically has a value of about 0.1:

$$363mu = 364mu = 0.1$$

iv) Torque equilibrium, again assuming a small back-taper angle 481, requires that the normal component 363$n$ of the sleeve clutch force 363 is substantially equal to the normal component 364$n$ of the sleeve spline force 364:

$$363n = 364n$$

v) Now, the right-hand side of the inequality can be written:

$$363f + 364f = 0.1*363n + 0.1*364n = 0.2*363n$$

vi) The parallel component 363$p$ of the sleeve clutch force 363 is equal to the normal component 363$n$ multiplied by the tangent function of the back-taper angle 481:

$$363p = 363n * \tan(481)$$

vii) For back-tapered clutch teeth manufactured by a rolling process, the back-taper angle is in general not larger than 5 degrees, as was stated earlier:

$$\tan(481) = \tan(5 \text{ degrees}) < 0.09$$

viii) Thus, for conventional prior art back-tapered clutch teeth, the parallel component 363$p$ of the sleeve clutch force 363 is in general limited to:

$$363p < 0.09 * 363n$$

ix) By comparing the results in steps v) and viii) it can be seen that the inequality requirement is indeed not fulfilled in FIG. 4; 0.09 is not larger than 0.2. Thus, the back-taper angle 481 is not large enough to prevent gear hopout, that is, to enforce the relative motion between the clutch and spline teeth.

By eliminating the normal component 363$n$, the inequality requirement for relative motion can be written:

$$\tan(\text{back-taper angle}) > (\text{coefficient of friction between clutch teeth}) + (\text{coefficient of friction between spline teeth})$$

Assuming a common coefficient of friction between both clutch and spline teeth, this can be simplified:

$$\tan(\text{back-taper angle}) > 2*(\text{coefficient of friction between clutch and spline teeth})$$

Step iv) above assumes that the sleeve clutch force 363 acts on the same diameter as the sleeve spline force 364. This is the case for the tooth clutch in FIG. 3 and substantially the case for the corresponding forces in the planetary range section in FIG. 2. For the planetary range section 3 in U.S. Pat. No. 6,066,062, however, the back-tapered clutch teeth 67, 68, 69, 70 have a significantly smaller diameter than the inner teeth 57 of the sleeve 58. The inner teeth 57 of the sleeve 58 along with the teeth 65 of the planet gears 43 will act as splines for the axially moveable sleeve 58. In such a case, the inequality requirement will be:

$$\tan(\text{back-taper angle}) > (\text{coefficient of friction between clutch teeth}) + (\text{coefficient of friction between spline teeth})*(\text{pitch diameter of clutch teeth})/(\text{pitch diameter of spline teeth})$$

or, with a common coefficient of friction:

$$\tan(\text{back-taper angle}) > (\text{coefficient of friction between clutch and spline teeth})* (1+(\text{pitch diameter of clutch teeth})/(\text{pitch diameter of spline teeth}))$$

Figure 5:
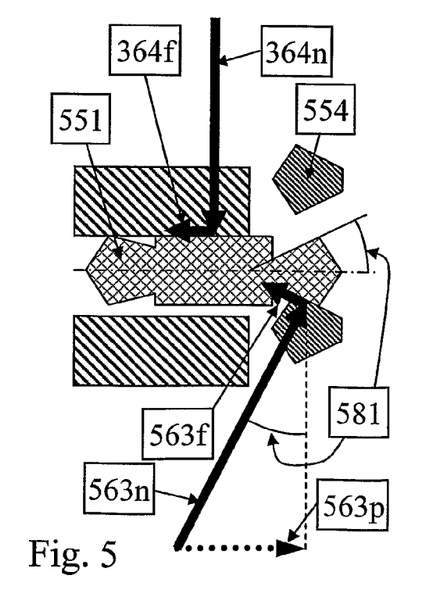
FIG. 5 shows a modified design of the clutch teeth of FIG. 4 according to the invention.

According to the invention, the back-taper angle shall be large enough to fulfil the inequality requirement. FIG. 5 shows a peripheral section of the clutch and spline teeth of a variant of the tooth clutch in FIG. 3 that has been modified according to the invention. The clutch teeth of a modified second gearwheel 554 and the mating clutch teeth of a modified engaging sleeve 551 have a modified back-taper angle 581 that is significantly larger compared to the back-taper angle 481 in FIG. 4. Thereby, the parallel component 563$p$ of the sleeve clutch force 563 is larger than the sum of the friction force 563$f$ between the clutch teeth and the friction force 364$f$ between the spline teeth. Then, relative motion between the parts involved is possible, and gear hopout is prevented.

Thus, when the back-taper angle 581 is large enough to fulfil the inequality requirement, the self-retaining ability of the tooth clutch is increased significantly. The parallel component 563$p$ of the sleeve clutch force 563 is then large enough to be able to pull the engaging sleeve 551 towards fully engaged state. Thereby, gear hopout is prevented also for conditions of a misaligned engaging sleeve, for instance as shown in FIG. 2 and FIG. 3.

For the case of equal pitch diameters of the clutch and spline teeth along with a coefficient of friction of 0.1, the inequality requirement is:

$$\tan(\text{back-taper angle}) > 0.1 + 0.1 = 0.2$$

This implies that the back-taper angle shall be at least 11.3 degrees. Furthermore, for an extreme case of the planetary range section 3 in U.S. Pat. No. 6,066,062, the pitch diameter of the inner teeth 57 could be twice as large as the pitch diameter of the clutch teeth 67, 68, 69, 70:

$$\tan(\text{back-taper angle}) > 0.1 + 0.1 \cdot 1/2 = 0.15$$

This is equivalent to a back-taper angle of at least 8.5 degrees. This is still significantly more than the above mentioned 5 degrees that can be regarded as an approximate upper limit of the back-taper angle that can be achieved by a cost-efficient rolling operation.

Instead, less cost-efficient manufacturing methods, for instance cutting methods such as shaping, will have to be used for sets of clutch teeth that are made by modifying a set of spline or gear teeth.

In order to keep the costs down, it would be of advantage to keep the use of said less cost-efficient manufacturing methods to a minimum. This is addressed in an embodiment of the invention. Thereby, it is noted that in planetary range sections with a retarder, as in FIG. 2, the described risk for gear hopout occurs when there is simultaneous retarder and engine braking operation in the high-range direct position. Then, it would be sufficient to have a large back-taper angle on those flanks of the clutch teeth that are in contact during engine braking, only. The opposite flank of each clutch tooth could have a smaller back-taper angle. This could be made using a combination of manufacturing methods for sets of clutch teeth that are made by modifying a set of spline or gear teeth. As an example, a rolling operation could be used to make a small back-taper angle on both flanks of the clutch teeth. Then, a shaping operation could be used to form a large back-taper angle only on the flanks that are in contact with the mating clutch teeth during engine braking.

Figure 6:
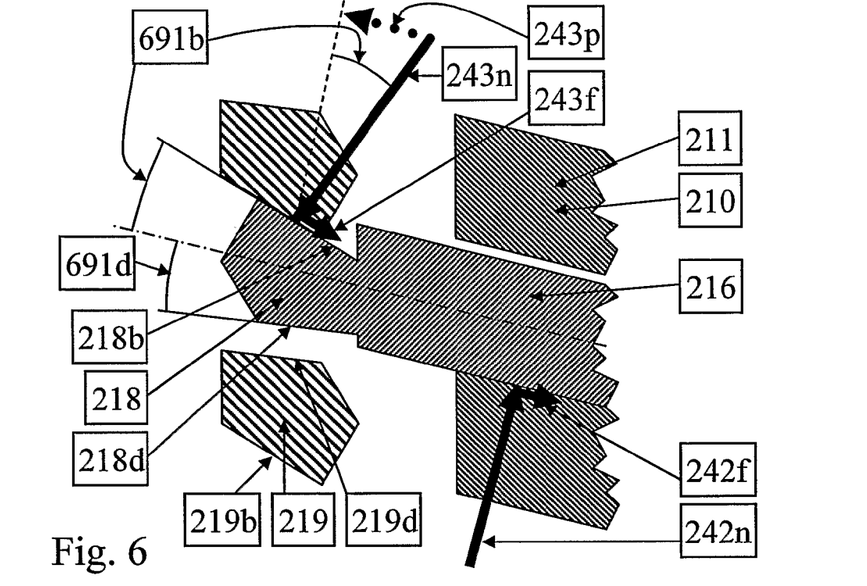
FIG. 6 shows a modified design of the clutch teeth of FIG. 2 according to an embodiment of the invention.

FIG. 6 shows a peripheral section of meshing clutch teeth in the high range direct position during retarder and engine braking operation of the planetary range section 201 of FIG. 2. In order to prevent gear hopout due to misalignment, the flanks of the clutch teeth that are in contact have a large back-taper angle according to the invention. The clutch teeth 218 of the ring gearwheel 217 have braking flanks 218b that during engine braking operation are in contact with corresponding braking flanks 219b on the clutch teeth 219 of the direct engaging ring 220. Similarly, there are driving flanks 218d and 219d that are in contact during engine driving operation, that is, when the engine drives the vehicle. The braking flanks 218b and 219b have a large back-taper angle 691b, and the driving flanks 218d and 219d have a normal, small, back-taper angle 691d. The large back-taper angle 691b makes the parallel component 243p of the ring clutch mesh force 243 larger than the sum of the friction components 242f and 243f of the ring gear mesh force 242 and ring clutch mesh force 243, respectively. Thereby, gear hopout is prevented during simultaneous retarder and engine braking operation. During engine driving operation, the retarder unit 230 is not in operation, and no gear mesh forces 240 will act on the retarder driver gearwheel 233 in FIG. 2. Hence, there will be no tendency to misalign the output shaft 214, and no large back-taper angle is required on the driving flanks 218d and 219d for preventing gear hopout.

In general, a retarder unit 230 is optional and is only included in a minority of the gearboxes. Therefore, from a cost point of view it would not be of advantage to have a large back-taper angle 691b on the braking flanks 218b and 219b in all gearboxes. Instead, it would be better to have the large back-taper angle 691b in gearboxes with a retarder unit 230, only. In gearboxes that do not have a retarder unit, both flanks of the clutch teeth 218 and 219 could have conventional, small, back-taper angles. However, if any of the braking flanks 218b and 219b in a gearbox with a retarder unit 230 would have a conventional, small, back-taper angle, the ability to prevent gear hopout is lost. Thus, it is important to, as soon as possible, discover an accidentally assembled ring gearwheel 117 or direct engaging ring 120 with a conventional, small, back-taper angle on the braking flanks in a gearbox with a retarder unit 230.

Figure 7:
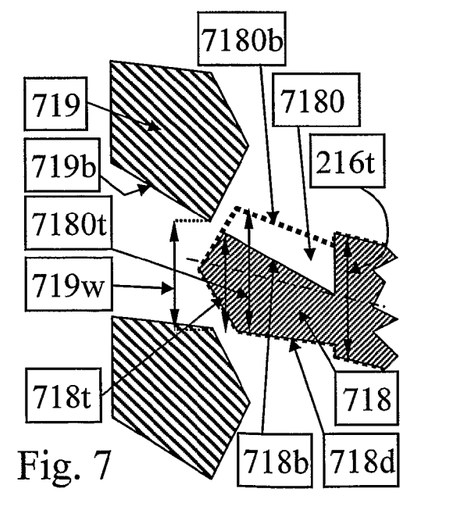
FIG. 7, FIG. 8 and FIG. 9 show variants of the clutch teeth of FIG. 6 according to embodiments of the invention, said embodiments making it easy to detect wrong assembled parts.

FIG. 7 shows a modified design of the clutch teeth in FIG. 6. After a rolling operation, the clutch teeth 7180 on the ring gearwheel have a conventional, small, back-taper angle on both flanks 7180b and 718d. In that condition, the ring gearwheel is equivalent to ring gearwheels 117 used in gearboxes that do not have a retarder unit 230. The maximum pitch diameter tooth thickness 7180t of these rolled clutch teeth 7180 is similar to the pitch diameter tooth thickness 216t of the internal gear teeth 216 of the ring gearwheel. For gearboxes with a retarder unit 230, the clutch teeth 718 of the ring gearwheel 217 have reduced maximum pitch diameter tooth thickness 718t compared to FIG. 6. In principle, more material has been removed by the additional cutting process when creating the braking flank 718b, starting from clutch teeth 7180. Moreover, the clutch teeth 719 of the direct engaging ring 220 have increased tooth thickness and, hence, decreased minimum pitch diameter tooth space width 719w compared to FIG. 6. The minimum pitch diameter tooth space width 719w is smaller than the maximum pitch diameter tooth thickness 7180t of the rolled clutch teeth 7180. Thereby, a ring gearwheel with the thick, rolled clutch teeth 7180 with a conventional, small, back-taper angle on both flanks cannot mesh with a direct engaging ring 220 that has thick clutch teeth 719 with a large back-taper angle on the braking flanks 719b. Thus, in a gearbox with a retarder unit, it easy to detect a ring gearwheel 117 made for a gearbox without a retarder unit.

Figure 8:
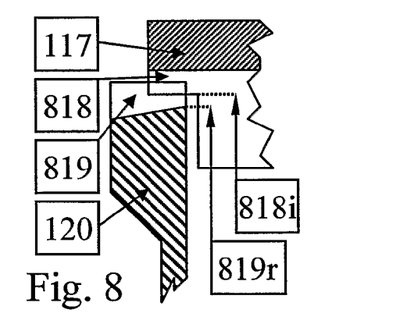
Figure 9:
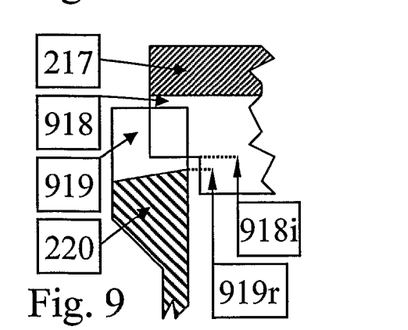

FIG. 8 and FIG. 9 show a further embodiment of the invention. That embodiment solves the problem of detecting a direct engaging ring 120 with a conventional, small, back-taper angle on the braking flanks in a gearbox with a retarder unit 230. In FIG. 8, a longitudinal section is shown of a modified design of the clutch teeth 818 and 819 of the ring gearwheel 117 and direct engaging ring 120 for gearboxes without a retarder unit 230, that is, with a conventional, small, back-taper angle on both flanks. The minimum inner tip diameter 818i of the ring gearwheel clutch teeth 818 and the maximum root diameter 819r of the engaging ring clutch teeth 819 are included. In order to allow meshing of the clutch teeth 818 and 819, the minimum inner tip diameter 818i must be larger than the maximum root diameter 819r. Similarly, FIG. 9 shows a corresponding section of clutch teeth 918 and 919 of the ring gearwheel 217 and direct engaging ring 220 with a large back-taper angle on the braking flanks for gearboxes with a retarder unit 230. Included are the minimum inner tip diameter 918i of the ring gearwheel clutch teeth 918 and the maximum root diameter 919r of the engaging ring clutch teeth 919. Again, the minimum inner tip diameter 918i must be larger than the maximum root diameter 919r to enable meshing of the clutch teeth. Now, the maximum root diameter 819r is larger than the minimum inner tip diameter 918i. Thereby, the clutch teeth 918 of a ring gearwheel 217 made for gearboxes with a retarder unit 230 cannot mesh with the clutch teeth 819 of a direct engaging ring 120 that is made for gearboxes without a retarder unit 230. Thus, in a gearbox with a retarder unit, it easy to detect an accidentally assembled direct engaging ring 120 made for a gearbox without a retarder unit.

Although the present invention has been set forth with a certain degree of particularity, it is understood that various modifications, substitutions and rearrangements of the components are possible without departing from the spirit and scope of the invention as hereinafter claimed.

The invention claimed is:

1. System for preventing gear hopout in a tooth clutch in a vehicle transmission, comprising an input shaft that at least in some states of operation is connected to a prime mover, and an output shaft connected to driven wheels of the vehicle, the tooth clutch comprising an engaging sleeve having sleeve clutch teeth that can selectably be brought in and out of an engaged state with mating clutch teeth by axial displacement of the engaging sleeve, the tooth clutch causing in the engaged state a first rotating system to rotate in unison with a second rotating system, the sleeve clutch teeth and the mating clutch teeth having a clutch teeth pitch diameter, the sleeve clutch teeth having sleeve driving tooth flanks in contact, in the engaged state when power is transferred from the input shaft to the output shaft, with mating driving tooth flanks of the mating clutch teeth, the sleeve clutch teeth further having sleeve braking tooth flanks in contact, in the engaged state when power is transferred from the output shaft to the input shaft, with mating braking tooth flanks of the mating clutch teeth, the sleeve driving tooth flanks and the mating driving tooth flanks substantially being back-tapered with a driving back-taper angle, the sleeve braking tooth flanks and the mating braking tooth flanks substantially being back-tapered with a braking back-taper angle, the engaging sleeve having sleeve spline or gear teeth that are in mesh with mating spline or gear teeth on at least one mating rotating part, the sleeve spline or gear teeth and the mating spline or gear teeth having a spline teeth pitch diameter when meshing, the sleeve clutch teeth and the mating clutch teeth having a clutch coefficient of friction for axial motion of the engaging sleeve, and when meshing, the sleeve spline or gear teeth and the mating spline or gear teeth (110, 210) having a spline coefficient of friction for axial motion of the engaging sleeve, wherein a tangent function for at least one of the driving back-taper angle and the braking back-taper angle is larger than an average value of the clutch coefficient of friction and the spline coefficient of friction multiplied by a sum of unity and a ratio of clutch teeth pitch diameter and spline teeth pitch diameter.

2. A system as in claim 1, wherein the clutch teeth pitch diameter and the spline teeth pitch diameter are substantially equal, and the tangent function for at least one of the driving back-taper angle and the braking back-taper angle is larger than twice the average value.

3. A system as in claim 1, wherein at least one of the driving back-taper angle and the braking back-taper angle is larger than 8 degrees.

4. A system as in claim 1, wherein at least one of the driving back-taper angle and the braking back-taper angle is larger than 10 degrees.

5. A system as in claim 1, wherein at least one of the driving back-taper angle and the braking back-taper angle is larger than 12 degrees.

6. A system as in claim 1, wherein the vehicle transmission comprises a supporting shaft that is rotatably supported by a transmission housing system in two bearing arrangements and a supported shaft that is being rotatably supported by the transmission housing system in a first support system by a bearing arrangement; the supported shaft being substantially coaxial with the supporting shaft.

7. A system as in claim 6, wherein the first rotating system comprises at least one of the supporting shaft and a gearwheel that is arranged on the supporting shaft, and the second rotating system comprises at least one of the supported shaft and a gearwheel that is arranged on the supported shaft.

8. A system as in claim 7, wherein the supported shaft under a set of operating conditions is supported radially by the supporting shaft in a second support system that is located axially apart from the first support system.

9. A system as in claim 8, wherein a substantial part of the radial support in the second support system is provided by contact forces acting between teeth in the tooth clutch.

10. A system as in claim 8, wherein the set of operating conditions comprises cases when the supported shaft is being urged by external loads towards misaligned state in relation to the supporting shaft, the external loads acting on the supported shaft or on a part arranged on the supported shaft.

11. A system as in claim 10, wherein the external loads are caused by operation of an auxiliary brake system.

12. A system as in claim 11, wherein the braking back-taper angle is included in the at least one of the driving back-taper angle and the braking back-taper angle.

13. A system as in claim 12, wherein the driving back-taper angle is not included in the at least one of the driving back-taper angle and the braking back-taper angle.

14. A system as in claim 12, wherein on the engaging sleeve, the braking back-taper angle on the sleeve braking tooth flanks is made in an additional machining operation from an intermediate flank having a back-taper angle less than 6 degrees.

15. A system as in claim 10, wherein the vehicle transmission is made at least in a retarder variant having an auxiliary brake system and a standard variant not having an auxiliary brake system, and the at least one of the driving back-taper angle and the braking back-taper angle is only on parts that are used in the retarder variant and are not used in the standard variant.

16. A system as in claim 15, wherein for the retarder variant the mating clutch teeth have space width that is smaller than a tooth thickness of the sleeve clutch teeth for the standard variant, thereby preventing engagement.

17. A system as in claim 15, for the standard variant the mating clutch teeth have a root diameter that is larger than an internal tip diameter of the sleeve clutch teeth for the retarder variant, thereby preventing engagement.

18. A system as in claim 1, wherein the tooth clutch is part of a compound section of range type and/or splitter type in the vehicle transmission.

* * * * *